(12) United States Patent
Tender (10) Patent No.: US 8,148,019 B2
(45) Date of Patent: Apr. 3, 2012

(54) METHOD AND APPARATUS FOR GENERATING POWER FROM VOLTAGE GRADIENTS AT SEDIMENT-WATER INTERFACES USING ACTIVE TRANSPORT OF SEDIMENT POREWATER

(75) Inventor: Leonard M Tender, Bethesda, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 2221 days.

(21) Appl. No.: 11/044,166

(22) Filed: Jan. 28, 2005

(65) Prior Publication Data

US 2006/0172186 A1     Aug. 3, 2006

(51) Int. Cl.
*H01M 8/00* (2006.01)
*H01M 8/04* (2006.01)
*H01M 8/24* (2006.01)
*H01M 2/40* (2006.01)
*H01M 2/38* (2006.01)

(52) U.S. Cl. ......... 429/400; 429/428; 429/456; 429/119

(58) Field of Classification Search ................. 429/119, 429/81, 234.8, 47, 149, 231.8, 400, 428, 429/456; 29/623.1–623.5; 210/153, 237; 440/88

See application file for complete search history.

(56) References Cited

U.S. PATENT DOCUMENTS

| | | | |
|---|---|---|---|
| 2,976,342 A | 3/1961 | Morehouse et al. | |
| 3,685,983 A | 8/1972 | Louzos | |
| 4,085,254 A | 4/1978 | Atkins | |
| 4,278,743 A * | 7/1981 | Thompson | 429/119 |
| 4,776,820 A * | 10/1988 | Mapes | 440/77 |
| 4,959,146 A * | 9/1990 | Kristan | 210/237 |
| 5,158,838 A | 10/1992 | Bjordal et al. | |
| 5,242,768 A | 9/1993 | Nagatsuka et al. | |
| 5,288,564 A | 2/1994 | Klein et al. | |
| 5,427,871 A * | 6/1995 | Garshol et al. | 429/119 |
| 5,770,945 A | 6/1998 | Constable | |
| 5,922,903 A | 7/1999 | Pujado | |
| 6,573,008 B1 * | 6/2003 | Hasvold | 429/231.8 |
| 6,575,248 B2 | 6/2003 | Zhang et al. | |
| 6,581,537 B2 * | 6/2003 | McBride et al. | 114/312 |
| 6,913,854 B1 | 7/2005 | Alberte et al. | |

FOREIGN PATENT DOCUMENTS

WO    WO-01/39306        5/2001
WO    WO 01/39306 A1 *   5/2001

OTHER PUBLICATIONS

Bond D.R. et al. "Electrode Reducing Microorgaisms that Harvest Energy from Marine Sediments" Science, vol. 295, 483-485 :Jan. 18, 2002.

Bilal, "Thermo-Electrochemical Reduction of Sulfate to Sulfide Using a Graphite Cathode," J. Appl. Electrochem., 28,1073, (1998).

(Continued)

*Primary Examiner* — Barbara Gilliam
*Assistant Examiner* — Claire L Roe
(74) *Attorney, Agent, or Firm* — Amy L. Ressing; Joseph T. Grunkemeyer (57) ABSTRACT

An apparatus and method for generating power from the voltage gradient naturally found in marine sediments. A pump flows sediment porewater to an anode, and a cathode is exposed to marine water. The arrangement can power a circuit.

18 Claims, 4 Drawing Sheets

OTHER PUBLICATIONS

Habermann, et al., "Biological Fuel Cells With Sulphide Storage Capacity," Applied Microbiology Biotechnology, 35, 128, (1991).
Zhang, et al., "Modelling of a Microbial fuel Cell Process," Biotechnology Letters, vol. 17 No. 8, pp. 809-814 (Aug. 1995).
Reimers et al, "Harvesting Energy From the Marine Sediment-Water Interface", Environmental Science & Technology, 2001, vol. 35, No. 1, pp. 192-195.
Tender et al, "Harnessing Microbially Generated Power on the Seafloor", Nature Biotechnology-Research Article, Aug. 2002, vol. 20, pp. 821-825.
Delong. et al. "Power From the Deep" Nature Biotechnology, 20, 788-789 (2002).
Rejections in U.S. Appl. No. 11/307,561.

* cited by examiner

METHOD AND APPARATUS FOR GENERATING POWER FROM VOLTAGE GRADIENTS AT SEDIMENT-WATER INTERFACES USING ACTIVE TRANSPORT OF SEDIMENT POREWATER

BACKGROUND OF THE INVENTION

1. Field of the Invention

The invention relates generally to fuel cells for use in marine sediment and seawater.

2. Description of the Prior Art

Typically, marine/oceanographic sensors and instruments deployed in water are powered by batteries. The key limitation of battery-based power supplies is depletion (i.e., exhaustion of energy content) which limits the period of time over which a sensor or instrument can operate. Many marine/oceanographic sensors and instruments deployed in water operate for short periods of time that are easily sustained by batteries. Many others (present or envisioned) operate unattended for longer-periods of time that are fundamentally limited by battery depletion requiring costly and resource intensive retrieval and redeployment cycles. It is widely recognized that many of these sensors and instruments would provide greater benefit if they could operate persistently.

U.S. patent application Ser. No. 10/148,104, incorporated herein by reference, discloses a fuel cell. It consists of an electrode imbedded in marine sediment connected by an external electrical circuit to an electrode positioned in overlying water. This fuel cell can generate power that is indefinitely sustained by continuous flux of reactants to each electrode. In the case of the anode, the flux of reactants is primarily attributed to diffusion of the reactants through sediment porewater. In the case of the cathode, the flux of reactants is primarily attributed to motion of the water by flow/and or convection. When the anode and cathode are the same size, the amount of sustained power generated is limited by the flux of anode reactants (porewater reductants). Initially, before generation of power, the concentration of anode reactants in sediment porewater at the anode surface is the same as that in bulk sediment in vicinity of the anode. Once power generation begins by connecting the anode to the cathode through the external circuit, anode reactants are consumed at the anode surface. This creates a local depletion zone of anode reactants about the anode surface that grows in thickness over time. Because the rate of diffusion of anode reactants from the bulk sediment in vicinity of anode to the anode surface is inversely proportional to the thickness of the depletion zone, power decreases overtime. The depletion zone eventually reaches a finite thickness due to multiple processes (e.g., convection) that replenish sediment anode reactants in vicinity of anode, resulting in sustained power that is, on average invariant over time.

The magnitude of sustained power generated scales proportionally with projected area of the anode. This property arises from the fact that sustained power is limited by diffusion of anode reactants and, and in accordance with Fick's Laws of Diffusion, the net rate of reactants diffusing to an electrode surface once an appreciable depletion zone is established is proportional to the projected area of the electrode. When the electrode consists of a square plate of nominal thickness with length of side S, the projected area is determined by S×S. The amount of sustained power generated is therefore independent of anode roughness or presence of spikes, grooves, holes, or other features that increase the total surface area of the anode relative to its projected area because these features do not increase the net flux of anode reactants to the anode. It is expected that the amount of sustained power generated would be same whether the anode were inserted into sediment parallel or perpendicular to the sediment surface.

The prior fuel cell may indefinitely generate sustained power of 0.05 to 0.035 W per square meter of anode projected area depending upon the specific marine environment. Many battery-powered marine sensors and instruments require up to 5-Watt sustained power averaged over time (taking into account duty cycles of energy consuming components). The prior fuel cell would therefore need to utilize an anode with a projected area of many hundreds of square meters to be utilized with the highest power consuming battery-powered marine sensors and instruments. Such anodes would be cost prohibitive and impractical to configure and deploy with sensors and instruments and to imbed into sediment. The prior fuel cell is therefore limited to utilization of low-power consuming sensors and instruments requiring, for example, up to 0.1-Watt sustained average power.

SUMMARY OF THE INVENTION

The invention comprises an apparatus comprising a container having one or more inlets and one or more outlets, an anode inside the container, a cathode capable of reducing at least one species found in marine water, a pump capable of pumping marine sediment porewater through the inlets into the container, to the anode, and through the outlets out of the container, and a rig coupled to the container, the cathode, and the pump capable of maintaining the inlets below a marine sediment surface and maintaining the cathode in a position exposing the cathode to marine water from above the sediment surface. The anode is capable of oxidizing at least one species found in marine sediment porewater at a rate greater than the porewater species is capable of passively diffusing to the anode The invention further comprises a method comprising: providing the above apparatus including an electrical circuit connected to the anode and the cathode, maintaining the apparatus with the inlets below a marine sediment surface and the cathode above the marine sediment surface, and pumping marine sediment porewater across the anode.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

In many fresh and salt-water marine environments substantial organic matter resides in sediment which sustains microbial activity that is limited by flux of oxidants (such as oxygen and sulfate) into sediment from overlying water. Within the topmost millimeters to centimeters of such sediments, microorganisms preferentially deplete oxygen, causing microorganisms deeper in sediment to utilize less potent oxidants (such as sulfate) and generate as byproducts potent reductants (such as sulfide). The depth-dependency of microbe utilized oxidant gives rise to distinctive chemical gradients in sediment porewaters as each oxidant is successively exhausted ($O_2$, $MnO_2$, $HNO_3$, $Fe_2O_3$, $SO_4^{-2}$) and its reaction products ($H_2O$, $Mn^{2+}$, $Fe^{2+}$, $S^{-2}$) produced. As a consequence, a natural redox gradient exists across the sediment/water interface in which porewater within such marine sediment millimeters to centimeters beneath the sediment surface is enriched in reductants compared to overlying water. Because of this redox gradient, an electrode imbedded in such marine sediment will equilibrate to a voltage that is often more than 0.7 volts negative that of an identical electrode positioned in overlying water at open circuit (i.e., when the electrodes are not electrically connected). Connection of the electrodes by an external circuit of appropriate resistance results in sustainable electron flow (electrical current) from the sediment imbedded electrode (termed "anode" because of its negative voltage) to the electrode in overlying water (termed "cathode" because of its positive voltage). Current is sustained at the anode by continual oxidation of reductants in sediment porewater and at the cathode by continual reduction of oxidants in water. The acquired electrons flow from the anode through the external circuit where they can do work (such as power a marine deployed sensor or instrument) and continue with dimensioned voltage to the cathode where current is sustained by continual reduction of oxygen and/or other oxidants in overlying water.

Measurements of the concentrations of different redox species within the vicinity of the fuel cell electrodes placed in estuarine and salt marsh sediments indicate that the dominant anode reaction(s) may be, but are not limited to:

$$S^{2-}+4H_2O \rightarrow SO_4^{2-}+8H^++8e^- \text{ or}$$

$$2Fe^{2+}+3H_2O \rightarrow Fe_2O_3+6H^++2e^-$$

whereas the cathode reaction may be, but is not limited to:

$$2O_2+8H^++8e^- \rightarrow 4H_2O$$

A suitable purpose of the invention is to persistently (i.e., indefinitely) generate sustained electrical power underwater by oxidation of marine sediment porewater with water from above the sediment/water interface. Possible applications of this power supply include, but are not limited to numerous marine sensors and instruments which are presently powered by batteries, which are limited in duration by battery depletion, which would provide scientific and/or operational and/or cost savings benefit if their duration could be greatly extended, and which are deployed in water in environments that include but are not limited to the continental margins, fresh water lakes, rivers, estuaries, and harbors.

Such sensors and instruments currently provide valuable information about marine environments. Ongoing developments in low-power microelectronics, sensors, and data telemetry continually expand their scope and impact. The duration of such instruments, typically on the order of months, is primarily limited by their battery-based power supplies. As a consequence, their long-term uninterrupted (i.e., persistent) operation, widely recognized as a desired capability, is not possible. Furthermore, long-term operation is only possible when either the instrument is retrieved and redeployed with fresh batteries or additional instruments deployed sequentially. Both scenarios are cost and resource intensive, defeat covertness, and interrupt continuity of operation. The power supply disclosed here is intended to provide many years (persistent) power for marine autonomous deployed sensors and instruments.

The container can be any container shaped such as to prevent a substantial amount of water from above the sediment from reaching the anode. A suitable shape is a vertical tube or caisson with the inlet and the bottom and the outlet at the top. The container may be completely buried in the sediment, partially buried, or have only the inlet in the sediment. The inlet may also be an extension of the container, such as a tube, with its opening in the sediment. The positioning of the inlet allows for only or mostly sediment and porewater to enter the inlet.

Optionally, a filter may be positioned across the inlet. The filter may prevent particulate or other non water-soluble components of the sediment from entering the container, while allowing porewater to enter. Optionally, there can be a valve across the inlet to close the inlet if desired.

An anode is located inside the container. There can be more than one anode in the container, or there can be more then one container, at least two of which or all of which having one or more anodes inside. When multiple constituent anodes are used, they may be electrically connected in parallel. Anode leads may be connected in parallel and terminate in an electrical circuit within the instrument or sensor, or the leads could be connected in parallel externally with a single lead passing into the interior of the sensor or instrument.

The anode can be a high surface area anode or otherwise have a high reactivity for oxidizing a porewater species. The advantage of high reactivity is that the anode can oxidize more material with the pump running then without the pump. Without the pump, the reaction rate would be limited by the rate that material could passively diffuse to the anode. The anode is capable of greater oxidation rates. Such an anode can take advantage of the pumping of porewater, bringing larger amounts of reactants to the anode. It is not necessary that the pump provide enough porewater to maximize the reaction at the anode, nor is it necessary that the anode oxidize all of the reactants pumped to it.

The cathode is exposed to marine water that is from above the sediment surface. As with the anode, more than one cathode connected in parallel may be used. An example of a suitable cathode is a cathode that has as much reactive capacity as the anode. It should be noted that a pump may not be necessary at the cathode, as the natural ambient motion of the water may be sufficient to bring adequate reactants to the cathode.

Figure 3:
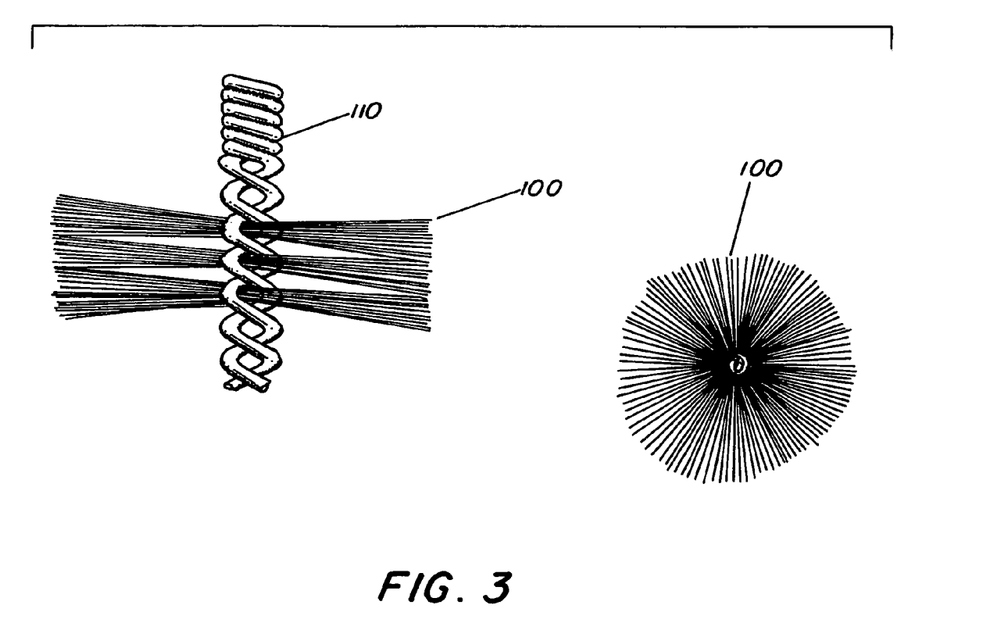
FIG. 3 schematically illustrates a bottle-brush electrode.

Suitable anodes and cathodes include, but are not limited to, graphite electrodes and graphite bottle brush electrodes. Such electrodes are schematically illustrated in FIG. 3. Graphite bottle brush electrodes can consist of, for example, approximately 2-inch long graphite yarn bristles 100 spun from 7-micron diameter graphite fibers and twisted between pairs of stainless steel or titanium wires 110 to facilitate robust electrical connection. Bottle brush electrodes can have very high surface area and have demonstrated long-term stability in numerous marine environments being used as cathodes in galvanic seawater cells for many years (see U.S. Pat. No. 5,427,871, incorporated herein by reference). With the exception of the stainless steel or titanium wire core, bottle brush electrodes may not be rigid and may collapse and compact when inserted directly into sediment. For this reason, they may be isolated from sediment particulate matter by placing them in anodic tubes. Each bottle brush anode can be connected at its stainless steel wire core to an electrical lead which passes through sealed holes into the interior of the instrument or sensor. Other very-high surface area electrodes may also be suitable as anodes. Such electrodes may include those fashioned from graphite foam or graphite cloth.

The pump may be any pump capable pumping porewater to the anode. The pump may be directly connected to the outlet or may be sufficiently close to the outlet to draw porewater out of the outlet. The outlet may be an extension of the container, such as a tube leading to the pump. The outlets may pass through sealed holes in an instrument to the pump. The pump outlet can lead to the exterior of the sensor or instrument. Alternatively, the pump and anodic tube outlets and pump outlet could be positioned outside the sensor or instrument.

The rig can be any structure to which the other components may be attached or coupled and maintained in the proper position. The term "coupled" includes direct attachment of a component to the rig, or indirect attachment by way of other named or unnamed components. For example, if the pump is directly attached to the container, and the container is directly attached to the rig, then the pump is coupled to the rig. Any position that allows porewater to enter the inlet and exposes the cathode to marine water is suitable.

The apparatus may be physically separated from the instrument or sensor it is powering. In this configuration, the rig can be a rigid, non corrosive frame and can, for example, constitute a mooring for an instrument tethered to the sediment surface. Alternatively, the apparatus can be physically integrated to an instrument and sensor which sits on the sediment surface. In this configuration, the anode can be affixed to the sediment imbedded bottom of the instrument while the cathode could be affixed to water exposed on the side or top. The rig may be contained in the instrument, or the instrument itself may be the rig.

Optionally, electrical leads can be attached to the anode and the cathode and to an electrical circuit. The circuit can be a device, instrument, or sensor to which it is desired to supply power from the apparatus. The pump may also receive power through the circuit. Example circuits may include, but are not limited to the following components in additional to the pump: an electrical energy storage device or devices such as batteries or capacitors, a charger which uses the power generated by the invention to charge the electrical energy storage device or devices, and sensors or instruments powered by the energy storage device. Example sensors and instruments include but are not limited to acoustic Doppler velocity profilers, acoustic sensors, seismometers, conductivity and temperature probes, surveillance instrumentation and various chemical sensors and transponders. Utilization of an energy storage device or devices and associated charger is to allow the invention to power sensors or instruments that require short bursts power greater than the sustained power of the invention.

The apparatus may be used by placing the inlet below a marine sediment surface and the cathode above the surface, letting the rig maintain the apparatus in this position, and letting the pump pump the porewater across the anode. Any salt- or fresh-water environment in which sediment is enriched in reductants is a suitable location. Examples include, but are not limited to, environments in which sediment is enriched in reductants owing to oxidant-limited microbial activity within the sediment and environments in which sediment is enriched in reductants owing to an upward flux of reductants from deeper within or beneath the sediment. Optionally, the container can be filled with water containing an oxidizable species and the valve closed before the apparatus is deployed. The water can have a similar composition to porewater. This allows the anode to be properly positioned without exposing it to marine water as the inlet is placed below the sediment surface. The valve is then opened once the inlet is below the sediment surface. Alternatively, the container can be left empty and the valve closed until the inlet is below the sediment surface. Once the valve is opened, the porewater may then reach the anode.

Figure 1:
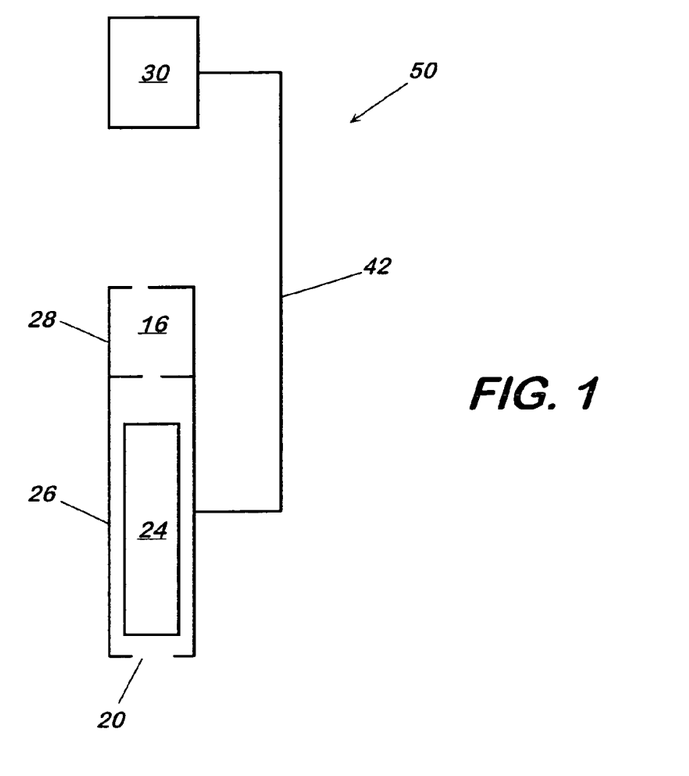
FIG. 1 schematically illustrates an embodiment of the apparatus of the invention.

FIG. 1 schematically illustrates an embodiment of the apparatus 60. The pump 16 is mounted on the outlet 28 of the container 26, with the inlet 20 on the other end. The anode 24 is inside the container 26. The container 26 and cathode 30 are mounted on a rig 42.

Figure 2:
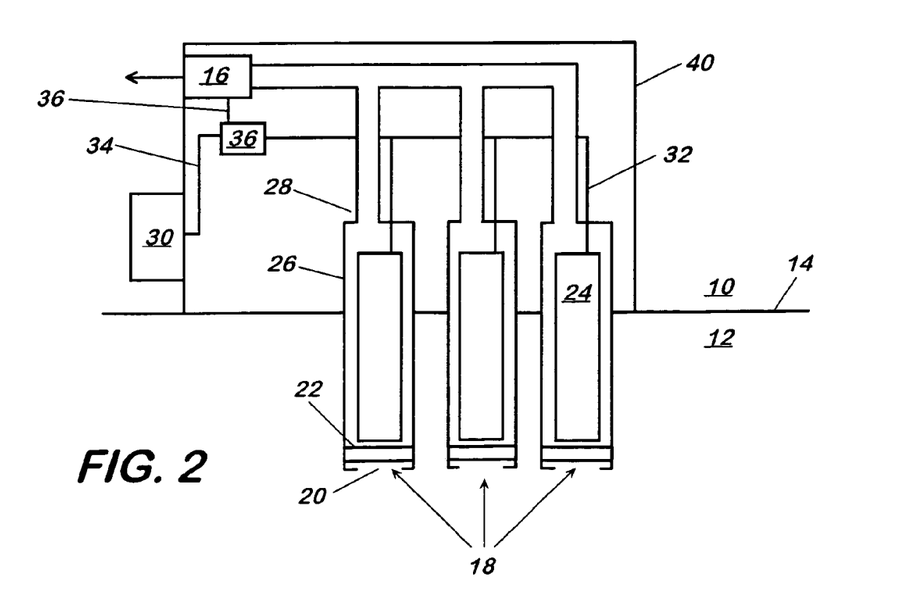
FIG. 2 schematically illustrates an embodiment of the apparatus of the invention.

FIG. 2 schematically illustrates another embodiment of the apparatus 50 when deployed. The marine water 10, sits above the sediment 12, with an interface 14 in between. The pump 16 draws porewater 18 into the inlets 20, through the filters 22, to the anodes 24 inside the containers 26, and through the outlets 28. The cathode 30 is in the marine water 10. Anode leads 32 and cathode lead 34 are connected to the circuit 36. Lead 38 supplies power from the circuit 36 to the pump 16. Instrument 40 houses the pump 16, circuit 35, leads 32, 34, 36, and part of the containers 26 and also serves as the rig. Instrument 40 may contain sensors and other devices attached the circuit 36.

In one embodiment the apparatus is configured to a sensor or instrument which sits on the sediment surface with its underside on or imbedded in sediment. There are numerous examples of such instruments which are battery-powered and which are limited in duration by battery depletion. An array, such as a hexagonal close packed array of anodic tubes, is affixed to the underside of the instrument or sensor and a cathode affixed to the instrument or sensor surface exposed to water above the sediment surface. The total sustained power is expected to be proportional to the number of anodic tubes configured to the instrument or sensor as long as the cathode is large enough to not limit power.

The anodic tube and pump configuration may generate greater sustained power, in comparison to the prior art fuel cell occupying the same footprint area on the sediment surface, by increasing the flux of anode reactants (porewater reductants) to the anode. This is achieved by pumping reactant-rich porewater from the sediment through the anodic tube across the anode surface, out the anodic tube outlet, through the pump, and out the pump outlet to water above the sediment surface. In order to generate greater sustained power it may be necessary to use high surface area anodes. Power would otherwise be limited by the rate at which the anode can oxidize porewater reductants arriving at the anode surface (i.e., kinetically limited power) and not by the rate at which porewater reductants arrive at the anode surface (mass transfer-limited power) which is enhanced by the configuration employed here. The prior art fuel cell was mass transfer limited. Using a high surface area anode in it would not increase sustained power compared to a smooth electrode of equal projected area.

The magnitude of sustained power generated may be dependent upon the size, geometry, and configuration of its various components. The best configuration may be dependent upon the specific sensor or instrument it is to power, its power requirement, how it is configured to the sensor or instrument, and the specific environment it is operated in.

Optimized flow geometry (i.e., power maximized with minimal flow) may be achieved through optimization of the anode, anodic tube, filtering material, outlets and pump. This property is relevant to limiting power required for pumping and minimizing clogging of inlet filtering material due to excessive flow.

In order to achieve high power, an array or anodic tubes can be assembled with sufficient total inlet area. For example, 1960 anodic tubes, each with inlet cross section area of 5.1 cm² could be assembled in an array to create a total inlet area of 1 m².

Minimized energy consumption by the pump may be achieved by use of highly efficient pumps. The pump could reside within the instrument or sensor to be powered or could be externally affixed. The pump could be powered by mechanical coupling to overlying water flow (tidal or sustained current) when water flow is sufficient (such as in a river or tidal basin), and/or or by an aspirator (no moving parts) based upon the Bernoulli Effect; and/or by electrical connection to the external circuit connecting the anode and cathode and sensor or instrument to be powered when power consumed by the pump is significantly less than power output of the apparatus.

To simplify deployment, only the anodic tube inlets need to be positioned beneath the sediment surface. The inlet may be, for example, approximately 10 cm below the sediment surface to ensure porewater entering anodic tubes is reductant-rich and to minimize pumping of water from above the sediment surface through sediment into the reservoir which would chemically short circuit the fuel cell.

Having described the invention, the following examples are given to illustrate specific applications of the invention. These specific examples are not intended to limit the scope of the invention described in this application.

EXAMPLE 1

Single-tube cell without pumping—A number of models were been examined. These models were operated in 10-gallon plastic aquaria each containing a sea floor consisting of ocean sediment and seawater. Sulfide-rich sediments obtained from a coastal marsh region near Tuckerton, N.J., were used. One model consisted of a single anodic tube and graphite bottle brush cathode. In this model, the anodic tube consisted of an 11-inch long×1-inch inner diameter (1.25-inch outer diameter) PVC tube with a matching PVC end cap attached to one (top) end. The filtering material consisted of a woven nylon scouring pad stretched across the open (bottom) end of the tube (inlet) using a nylon cable tie. The anode consisted of a 9-inch length of graphite bottle brush electrode inserted lengthwise into the tube. A water insulating electrical connection was fashioned at one end of the anode between the stainless steel wire core and a water-insulating electrical lead. The electrical lead was passed through a sealed hole in the reservoir end cap that excluded overlying seawater. The cathode consisted of 21-inch length of graphite bottle brush electrode with a water insulating electrical connection to a water-insulating electrical lead. The cathode was coiled and suspended in the aquarium above the sediment surface. The pump consisted of a peristaltic pump placed adjacent to the aquarium. The anodic tube outlet consisted of Tygon tubing passed through a sealed hole in the anodic tube end cap to exclude overlying water. Inserting a 2-inch diameter bottle brush electrode into a 1-inch diameter tube effectively filled the tube volume with graphite yarn. This created a very high surface area anode through which porewater was pumped with relatively uniform flow resistance through the tube.

When the anodic tube as inserted inlet end down through the overlying seawater into sediment without pumping, the reservoir filled with oxidant-rich seawater as determined by positive voltage of the anode. Gradually, the voltage of the anode tended negative until its voltage was consistent with that of reductant-rich porewater. It is assumed that this observation indicates that oxygen diffuses from within the reservoir into adjacent sediment where it was depleted and that reductants diffuse from adjacent sediment into the reservoir.

Short-term power production (over the course of approximately 4200 seconds) was characterized in the standard manner without pumping. This characterization provides a measure of the magnitude of power generation achievable before onset of appreciable depletion of porewater reductants within the reservoir when not pumping. A potentiostat was connected across the anode and cathode electrical leads to emulate a variable resistance load. The potentiostat was programmed to pass current with voltage beginning at the open circuit voltage (no current) of 0.65 V to the closed circuit value of 0.00 V with rate of change of voltage of 0.16V/s, and to measure current and power (product of voltage and current) at each voltage.

In the short-term before appreciable depletion of anode reactants in porewater within the anodic tube occurs when not pumping, power is not limited by surface area of anode. That is, there is sufficient anode surface area to immediately oxidize each equivalent of reductant that diffuses into contact with the anode. Power is limited at current below that of maximum power, by resistance to flux of charge compensating ion flow between the anode and the cathode though the intervening reservoir inlet filtering material, sediment, and water. This resistance (R) is determined to be 45Ω from analyses of data depicted in FIGS. 4 and 5 for the specific sediment and seawater used. Furthermore, determination of charge transfer resistance for other models of the invention with different inlet cross-sectional areas over the range of 5.1 cm² to 102 cm² examined using the same sediment and seawater revealed that charge transfer resistance is inversely proportional to the inlet area ($r^2$=0.992) and can be determined as R(Ω)=(235/A) where A is the inlet cross sectional area in cm². Furthermore, this result indicates, that under the condition when power is charge transfer resistance limited, the maximum achievable power may scale with inlet cross sectional area and may be calculated as P(Watt)=[(OCP−VMP)×VMP/R] where OCP is the open circuit voltage, and VMP is the voltage at maximum power. Furthermore, if maximum power limited by charge transfer resistance scales with inlet cross sectional area beyond the range of 5.1 cm² to 102 cm² thus far examined, then maximum power expected for a 1 m² area inlet (i.e., 112 cm diameter inlet) is 5.2 Watt and for a 3.14-m² area inlet (i.e., 200 cm diameter inlet) is 16.4 Watt using average values of OCP and VMP of 0.7 V and 0.35V respectively. This represents a 250-fold increase in power density compared to the prior fuel cell using the same sediment and seawater based on footprint area occupied on sediment surface. Furthermore, such inlet cross sectional inlet areas are in line with footprint areas of most high-power consuming battery powered marine instruments and sensors indicting that the invention can in principle supply more than sufficient power for such instruments.

Figure 4:
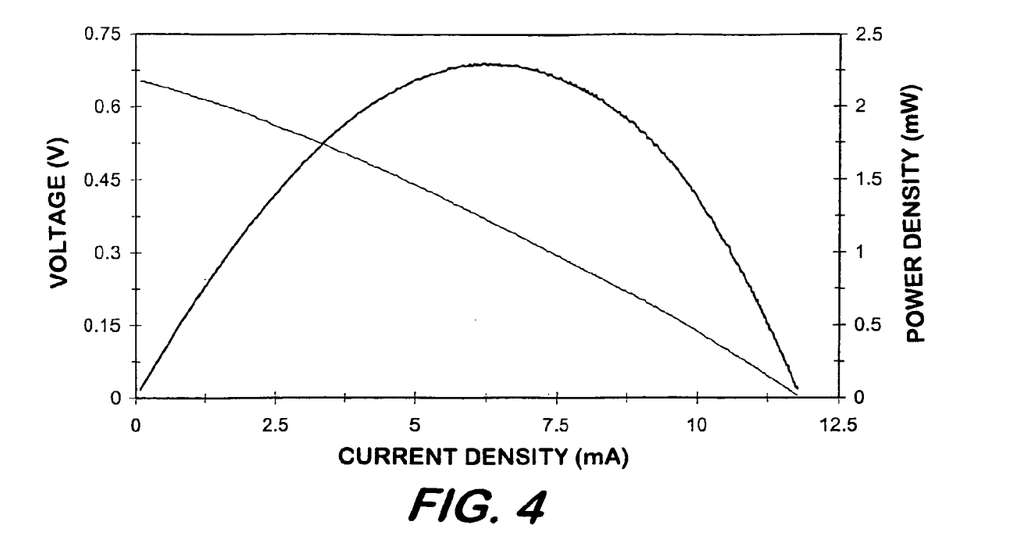
FIGS. 4 and 5 show short-term characterization of the fuel cell without pumping.
Figure 5:
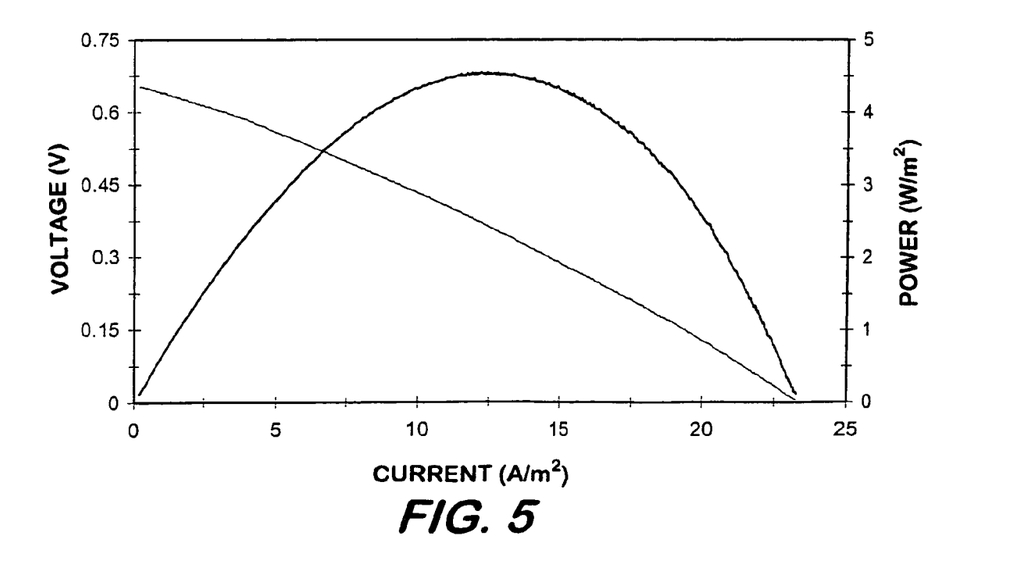

In FIGS. 4 and 5, the same voltage and current data are plotted. This model had an inlet cross sectional area of 5.1 cm². In each graph the same voltage vs. current data are plotted in two forms. In FIG. 4 voltage (left axis) and power (product of voltage and current, right axis) vs. current is shown. In FIG. 5 voltage (left axis) and power density (product of voltage and current density, right axis) vs. current density (current normalized to inlet cross sectional area) is shown. The voltage vs. current data plotted in these graphs was obtained by systematically reducing resistance of external circuit and monitoring decrease in voltage with concomitant increase in current. The specific technique used here reduced resistance such that voltage decreased linearly with time at a rate of 0.0016 V/S require less than 4200 S to complete the characterization. This data provides an estimation of the maximum amount of power sustainable by this model (2.3 mW) and the voltage at which maximum power is achieved (0.35 V) when moderate depletion of anode reactants has occurred within the reservoir. This data therefore provides an indication of the amount of sustained power expected when there is sufficient flow of anode porewater through the anodic tube so that there is minimum depletion of anode reactants within anodic tube. This data also indicates, that if the total flux of anode reactants is proportional to footprint area of the invention (i.e., area of inlet opening) as has been demonstrated in the laboratory over the range of 5.1 $cm^2$ to 102 $cm^2$, then the amount of sustained power expected for an array of such tubes with a total footprint area of 1 $m^2$ is 4.5 W at 0.35 V.

The peak in power observed with increasing current results from the onset of mass transfer limited power. This limitation arises from the onset of appreciable depletion of anode reactants in porewater within the anodic tube.

EXAMPLE 2

Figure 6:
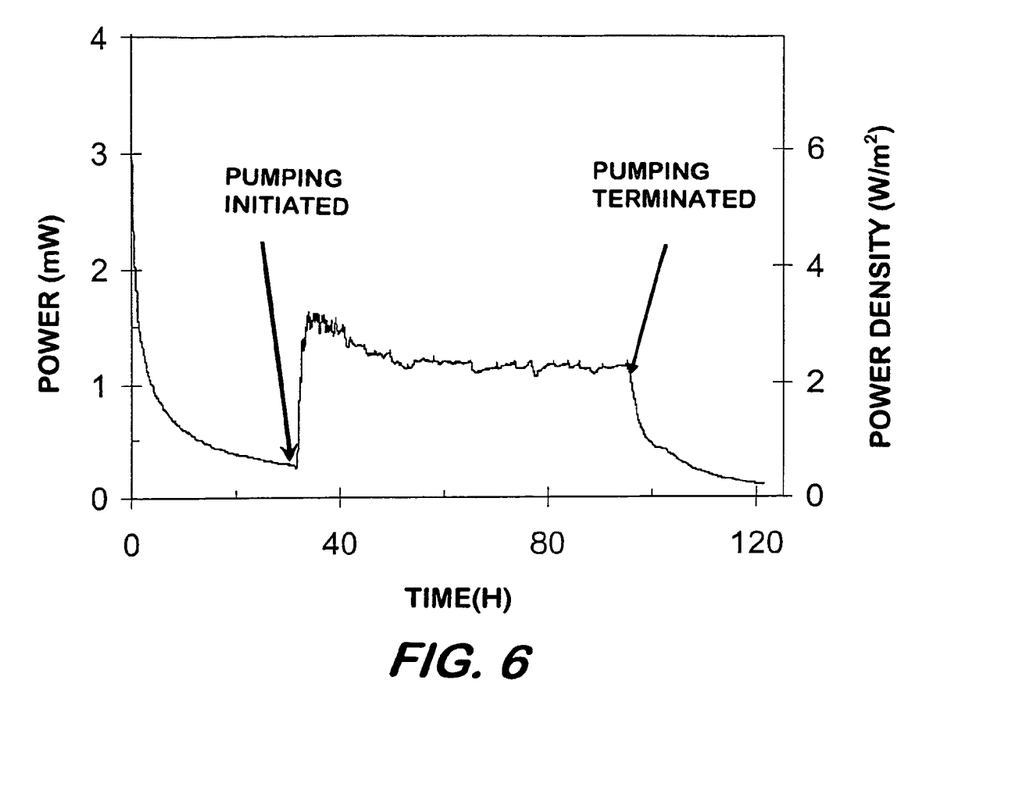
FIG. 6 shows long-term characterization of the fuel cell including use of the pump.

Single-tube cell with pumping—Long-term power production was characterized in the standard manner. A potentiostat was connected across the anode and cathode electrical leads to emulate a variable resistance load across which current was passed between the anode and cathode at fixed voltage of 0.35 V corresponding to the average voltage of maximum power determined from analysis of FIGS. 4 and 5. In the case of the model characterized in the short term in Example 1, the fuel cell was at open circuit voltage of 0.702 V, then discharged using a potentiostat such that the voltage was maintained at 0.35V. In FIG. 6, the left axis scaling indicates sustained power, right axis scaling indicates sustained power density (power normalized to inlet area of 5.1 $cm^2$). Characterization indicates the magnitude of power decreased to 0.29 mW (0.57 $W/m^2$) after 31.7 hours of power generation at 0.35 V. At 31.7 hours, the pump was turned on at rate of 21 mL/min. This resulted in an immediate increase in power which settled to a sustained value of 1.1 mW (4.5 $W/m^2$ inlet area) after 55 hours of total power generation. Power eventually settled at 1.1 mW (2.2 $W/m^2$). After 95.6 hours, the pump was turned off and power immediately decreased. This result indicates that pumping porewater through the reservoir increases mass transfer of anode reactants to the anode thereby increasing power. Comparison of FIG. 6 to FIGS. 4 and 5 indicates that the effect is not optimized in this specific model of invention characterized when pumping at 21 mL/min.

FIG. 6 shows long-term characterization of power generation. Here, After 31.7 hours of power generation without pumping, power had decreased to 0.29 mW due to depletion of anode reactants in anodic tube. At this time, the pump was turned on so as to pump porewater through the pump at rate of 21 mL/min. The data indicates that pumping porewater through the anodic tube dramatically increases sustained power.

Obviously, many modifications and variations of the present invention are possible in light of the above teachings. It is therefore to be understood that the claimed invention may be practiced otherwise than as specifically described.

What is claimed is:

1. An apparatus comprising:
 a container having one or more inlets and one or more outlets;
 an anode inside the container, the anode being capable of oxidizing at least one species found in marine sediment porewater at a rate greater than the porewater species is capable of passively diffusing to the anode;
 a cathode capable of reducing at least one species found in marine water;
 a pump capable of pumping marine sediment porewater through the inlets into the container, to the anode, and through the outlets out of the container; and
 a rig coupled to the container, the cathode, and the pump capable of maintaining the inlets below a marine sediment surface and maintaining the cathode in a position exposing the cathode to marine water from above the sediment surface.

2. The apparatus of claim 1, further comprising:
 a filter across the inlets capable of preventing at least one material selected from the group consisting of particulate components of the marine sediment and non water soluble components of the marine sediment from entering the inlets and capable of allowing the porewater to enter the inlets.

3. The apparatus of claim 2, further comprising:
 a valve across the inlets.

4. The apparatus of claim 1, further comprising:
 electrical leads capable of connecting the anode and the cathode to an electrical circuit.

5. The apparatus of claim 1, wherein the anode comprises a plurality of constituent anodes electrically connected in parallel.

6. The apparatus of claim 5, further comprising:
 a plurality of the containers, more than one of the plurality of the containers having at least one of the constituent anodes inside.

7. The apparatus of claim 1, wherein the cathode comprises a plurality of constituent cathodes electrically connected in parallel.

8. The apparatus of claim 1, wherein the anode comprises graphite.

9. The apparatus of claim 1, wherein the anode is a graphite bottle brush electrode.

10. The apparatus of claim 1, wherein the cathode comprises graphite.

11. The apparatus of claim 1, wherein the cathode is a graphite bottle brush electrode.

12. The apparatus of claim 1, wherein the apparatus is capable of generating enough power to operate the pump when the inlets are below the sediment surface and the cathode is exposed to the marine water.

13. The apparatus of claim 1, wherein the inlets are below the sediment surface and the cathode is exposed to the marine water.

14. A method comprising:
 providing an apparatus comprising:
  a container having one or more inlets and one or more outlets;
  an anode inside the container, the anode being capable of oxidizing at least one species found in marine sediment porewater at a rate greater than the porewater species is capable of passively diffusing to the anode;
  a cathode capable of reducing at least one species found in marine water;

a pump capable of pumping marine sediment porewater through the inlets into the container, to the anode, and through the outlets out of the container;
an electrical circuit connected to the anode and the cathode; and
a rig coupled to the container, the cathode, and the pump;
maintaining the apparatus with the inlets below a marine sediment surface and the cathode above the marine sediment surface; and
pumping marine sediment porewater across the anode.

15. The method of claim 14, further comprising:
filtering from the marine sediment at least one material selected from the group consisting of particulate matter and water insoluble components out of the porewater flowing to the anode.

16. The method of claim 14, further comprising:
opening a valve across the inlets while the inlets are below the marine sediment surface.

17. The method of claim 16, further comprising:
filling the container with water containing at least one oxidizable species and closing the valve before the inlet is below the marine sediment surface and before the valve is opened.

18. The method of claim 14, further comprising:
powering the pump with electrical current passing through the electrical circuit.

\* \* \* \* \*